(12) United States Patent
Noest et al.

(10) Patent No.: US 9,698,840 B2
(45) Date of Patent: Jul. 4, 2017

(54) RECEIVER AND A METHOD FOR REDUCING A DISTORTION COMPONENT RELATED TO A BASEBAND TRANSMIT SIGNAL IN A BASEBAND RECEIVE SIGNAL

(71) Applicant: Intel IP Corporation, Santa Clara, CA (US)

(72) Inventors: Peter Noest, Munich (DE); Jorge Ivonnet, Chandler, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/046,935

(22) Filed: Feb. 18, 2016

(65) Prior Publication Data

US 2016/0285487 A1 Sep. 29, 2016

(30) Foreign Application Priority Data

Mar. 27, 2015 (DE) .................. 10 2015 104 811

(51) Int. Cl.
*H04B 1/10* (2006.01)
*H04B 15/00* (2006.01)
*H04B 1/04* (2006.01)

(52) U.S. Cl.
CPC ......... *H04B 1/1027* (2013.01); *H04B 1/0475* (2013.01); *H04B 15/00* (2013.01)

(58) Field of Classification Search
CPC ......... H04B 1/1027; H04B 1/10; H04B 15/00
See application file for complete search history.

(56) References Cited

U.S. PATENT DOCUMENTS

| | | | | |
|---|---|---|---|---|
| 5,787,128 A | * | 7/1998 | Honkisz | H04L 7/042 375/343 |
| 6,259,402 B1 | * | 7/2001 | Asai | G01S 19/34 342/357.74 |
| 6,515,712 B1 | * | 2/2003 | Jeong | H03F 1/3247 348/608 |
| 7,876,867 B2 | | 1/2011 | Filipovic et al. | |
| 8,249,540 B1 | * | 8/2012 | Gupta | H04B 1/109 455/295 |
| 8,948,235 B2 | * | 2/2015 | Negus | H04B 15/00 370/210 |
| 2002/0141486 A1 | * | 10/2002 | Bottomley | H04L 25/03305 375/148 |
| 2008/0198948 A1 | * | 8/2008 | Tang | H04W 72/02 375/316 |
| 2010/0093298 A1 | * | 4/2010 | Pratt | H04B 17/21 455/226.1 |

* cited by examiner

*Primary Examiner* — Jean B Corrielus
(74) *Attorney, Agent, or Firm* — Eschweiler & Potashnik, LLC

(57) ABSTRACT

A receiver for reducing a distortion component related to a baseband transmit signal in a baseband receive signal is provided. The receiver includes a distortion meter including a correlation unit configured to correlate a signal that depends on the baseband receive signal and a signal that depends on the baseband transmit signal. The receiver further includes a combiner configured to provide the baseband receive signal using the received radio frequency signal and a plurality of settings based on a correlation result of the distortion meter.

20 Claims, 6 Drawing Sheets

RECEIVER AND A METHOD FOR REDUCING A DISTORTION COMPONENT RELATED TO A BASEBAND TRANSMIT SIGNAL IN A BASEBAND RECEIVE SIGNAL

CROSS REFERENCE TO RELATED APPLICATIONS

This application claims priority to German Application number 10 2015 104 811.6, filed on Mar. 27, 2015, the contents of which are herein incorporated by reference in its entirety.

FIELD

Some examples relate to receivers and methods for reducing a distortion component related to a baseband transmit signal in a baseband receive signal.

BACKGROUND

In communication devices where a transmit path and a receive path share a same antenna, an intermediate device, e.g., a duplexer, may be provided to connect the transmit path and the receive path to the antenna. For example, a duplexer may separate different frequency bands used for transmission and reception of radio frequency (RF) signals by means of frequency-selective filter elements. For example, a first frequency band may be used by the transmission path for transmitting RF signals, whereas a second frequency band may be used by the reception path for receiving RF signals. A distance between a frequency band for transmission and a frequency band for reception is called "duplex distance". For example, a duplex distance may be 30 MHz for Long Term Evolution (LTE) frequency band 17.

A duplexer should provide an adequate rejection of signal components related to transmission within a frequency band for reception. However, when a strong transmission signal, e.g., a transmission signal with great power, is provided to the duplexer, crosstalk to the frequency band used for signal reception may occur. Thus, an undesired crosstalk component may be caused in a receive signal and yield significant transmit power in the receive signal. Accordingly, a signal containing a desired receive signal component and the undesired crosstalk component related to a baseband transmit signal may be provided to a subsequent receiver. However, there may also be other processes causing undesired components in a receive signal provided to a receiver.

A mixer may be used in a receiver for down-mixing a received radio frequency signal to a baseband receive signal. A mixer may in general have a non-linear transfer function. That is, the relation between a signal input to the mixer and a signal output by the mixer is not linear. The linearity of a mixer or any other non-linear element may in general be classified using the n-th order Input Intercept Point (IIP). For a direct conversion receiver or a low intermediate frequency (IF) receiver, the second order Input Intercept Point (IIP2) of a receiver's mixer may have great influence on the receiver's performance. The IIP2 may be determined graphically by plotting an output power of a fundamental signal input in the mixer versus the input power of the fundamental signal and by plotting a same curve for a second order distortion component caused by the non-linearity of the mixer. The curve of the fundamental signal and the curve of the second order distortion component are extrapolated and the point where the extrapolated curves intersect each other is the IIP2. The IIP2 may alternatively be calculated. A higher input power associated to the IIP2 may correspond to a better linearity of the mixer since the input power at which the output power of the desirable signal and the output power of the distortion are equal is higher.

InterModulation Distortions (IMD) may be generated by the mixer receiving a signal having different frequency components. For example, unwanted signal components may be present within a baseband receive signal generated by a mixer resulting from the non-linearity of the same. Referring to the above example, signal components having a frequency related to the sum or the difference of frequencies of the desired receive signal component and the undesired crosstalk component input to the mixer may be present in the baseband receive signal generated by a mixer. In the above example, the generated undesired signal components are referred to as second order IMD components. The second order IMD components may lower a Signal-to-Noise Ratio (SNR) of the baseband receive signal, especially near sensitivity power levels of the receiver.

For reducing the second order IMD components, an offline calibration may be performed in order to enhance the linearity of a mixer. For example, the IIP2 of the mixer may be improved, e.g., shifted to higher input signal powers by the calibration. The calibration may, e.g., be performed by a manufacturer before distribution of the equipment or during stand-by operation of the equipment. For calibration, a transmission signal at a transmit carrier frequency may be provided via a closed loop calibration path to an auxiliary Low Noise Amplifier (LNA) to which the receiver is connected to. Thus, a transceiver internal test signal may be provided to the receiver which is, e.g., representative of the undesired transmit component caused by the duplexer at the presence of a strong transmission signal. As a first alternative, an external calibration signal may be provided to the auxiliary LNA which represents the undesired crosstalk component. As a second alternative, the external calibration signal may be provided to the regular LNA. However, further additional RF signal generation equipment is needed for the second alternative. Second order IMD components generated by the mixer of the receiver may be measured in the baseband receive signal provided by the mixer. A bias voltage applied to the mixer may be varied in order to minimize the second order IMD components in the baseband receive signal, which is also called mixer-tuning. However, the characteristics of the auxiliary LNA may be different from those of a regular LNA used in the receive path during normal operation for amplifying a received signal provided by the duplexer. Therefore, the bias parameters determined using the auxiliary LNA cannot be used with the regular LNA directly. Further elaborate adaption of the bias parameters is necessary, which may lead to non-optimal bias parameters for the mixer during normal operation. Moreover, calibration is merely possible at a manufacturer side or during stand-by operation. Also, the auxiliary LNA, the auxiliary receive path, the RF test signal generation and other components for the above closed loop calibration require space on a chip which includes the receive path. Hence, there may be a desire for improved reduction of distortion components in a baseband receive signal.

BRIEF DESCRIPTION OF THE DRAWINGS

Some examples of apparatuses and/or methods will be described in the following by way of example only, and with reference to the accompanying figures, in which.

DETAILED DESCRIPTION

Various example examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art, unless expressly defined otherwise herein.

Figure 1:
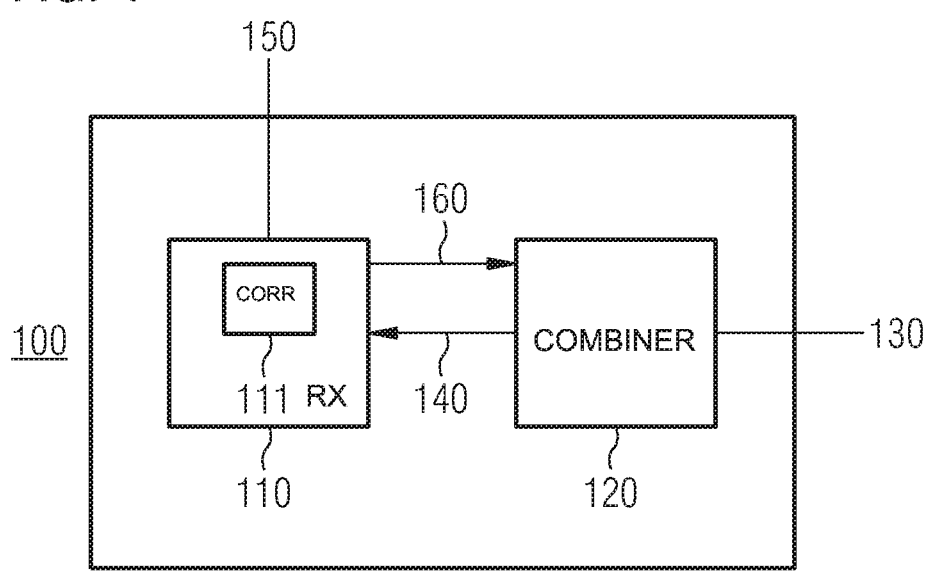
FIG. 1 illustrates an example of a receiver.

FIG. 1 illustrates an example of a receiver 100 for reducing a distortion component related to a baseband transmit signal 150 in a baseband receive signal 140. The receiver 100 comprises a distortion meter 110 which includes a correlation unit 111. The correlation unit 111 is configured to correlate a signal that depends on the baseband receive signal 140 and a signal that depends on the baseband transmit signal 150. The receiver 100 further comprises a combiner 120. The combiner 120 is configured to provide the baseband receive signal 140 using the received radio frequency signal 130 and a plurality of settings based on a correlation result 160 of the distortion meter 110.

According to some examples, the combiner is a mixer configured to downmix the received radio frequency signal to the baseband receive signal based on a correlation result of the distortion meter.

For example, the baseband transmit signal 150 may be a digital signal and the baseband receive signal 140 may be a digital signal. Hence, the distortion meter 110 and the correlation unit 111 may, e.g., be provided as digital processing elements.

The mixer settings may, e.g., comprise a bias voltage and/or a bias current for the combiner 120. Hence, the receiver 100 may be configured to adjust a bias voltage for the combiner 120 based on the correlation result 160. The combiner 120 may for example comprise one or more transistor elements and one or more amplifiers, e.g., one or more differential amplifiers. The transistor element may, e.g., use a local oscillator signal for down-mixing the received radio frequency signal 130 to the baseband receive signal 140. For example, a bias voltage may be applied to the one or more transistor elements based on the correlation result 160. Optionally, a bias voltage may further be applied to the amplifier of the combiner 120. The bias voltage may be used to increase a linearity of the combiner 120, which may in general have a non-linear transfer function. In the other words, the IIP2 of the combiner 120 may be shifted to higher input powers by applying a bias voltage to the combiner 120. In some examples, the receiver 100 may additionally or alternatively adjust a bias current of the combiner 120. In some examples, the combiner 120 may be mixing element, e.g., a mixer.

The distortion component related to the baseband transmit signal 150 in the baseband receive signal 140 may for example be a second order IMD component. The Second order IMD component in the baseband receive signal 140 may be caused by crosstalk from the transmit to the receive path in full duplex transmission systems, e.g. via a duplexer used to share a single antenna for transmission and reception.

The correlation result 160 of the distortion meter 110 may provide an estimation of the power of the distortion component in the baseband receive signal 140. Based on the correlation result, the combiner 120 may be adjusted, e.g., by adjusting a bias voltage of the combiner 120, in order to reduce the distortion component in the baseband receive signal 140. The receiver 100 may reduce the distortion component in the baseband receive signal 140 during regular operation of the receiver 100. For example, the combiner 120 may be adjusted during regular operation of the receiver 100. Moreover, no additional analog elements—like an auxiliary LNA—may be provided since the correlation result is determined using the receive signal chain used during regular operation. Further, the distortion meter 110 and the correlation unit 111 may be provided as digital elements, e.g., as parts of a digital processing unit of the receiver 100. Accordingly, the required space on a chip which includes the receiver 100 may be reduced as compared to conventional approaches. Furthermore, the complexity of the chip may be reduced since the number of analog elements on the chip may be reduced.

The example of a receiver 100 may comprise one or more additional optional features corresponding to one or more aspects of the proposed concept or one or more examples described below.

Some examples relate to a means for reducing a distortion component related to the baseband transmit signal 150 in the baseband receive signal 140. The means for reducing a distortion component comprises a means for determining the distortion component including a means for correlating the signal that depends on the baseband receive signal 140 and the signal that depends on the baseband transmit signal 150. The means for reducing a distortion component further comprises a means for providing the baseband receive signal 140 using the received radio frequency signal and a plurality of settings based on a correlation result of the means for determining the distortion component.

The means for determining the distortion component may be implemented by a distortion meter described above or below (e.g. FIG. 1). The means for correlating may be implemented by a correlation unit described above or below (e.g. FIG. 1). The means for providing the baseband receive signal may be implemented by a combiner described above or below (e.g. FIG. 1).

Figure 2:
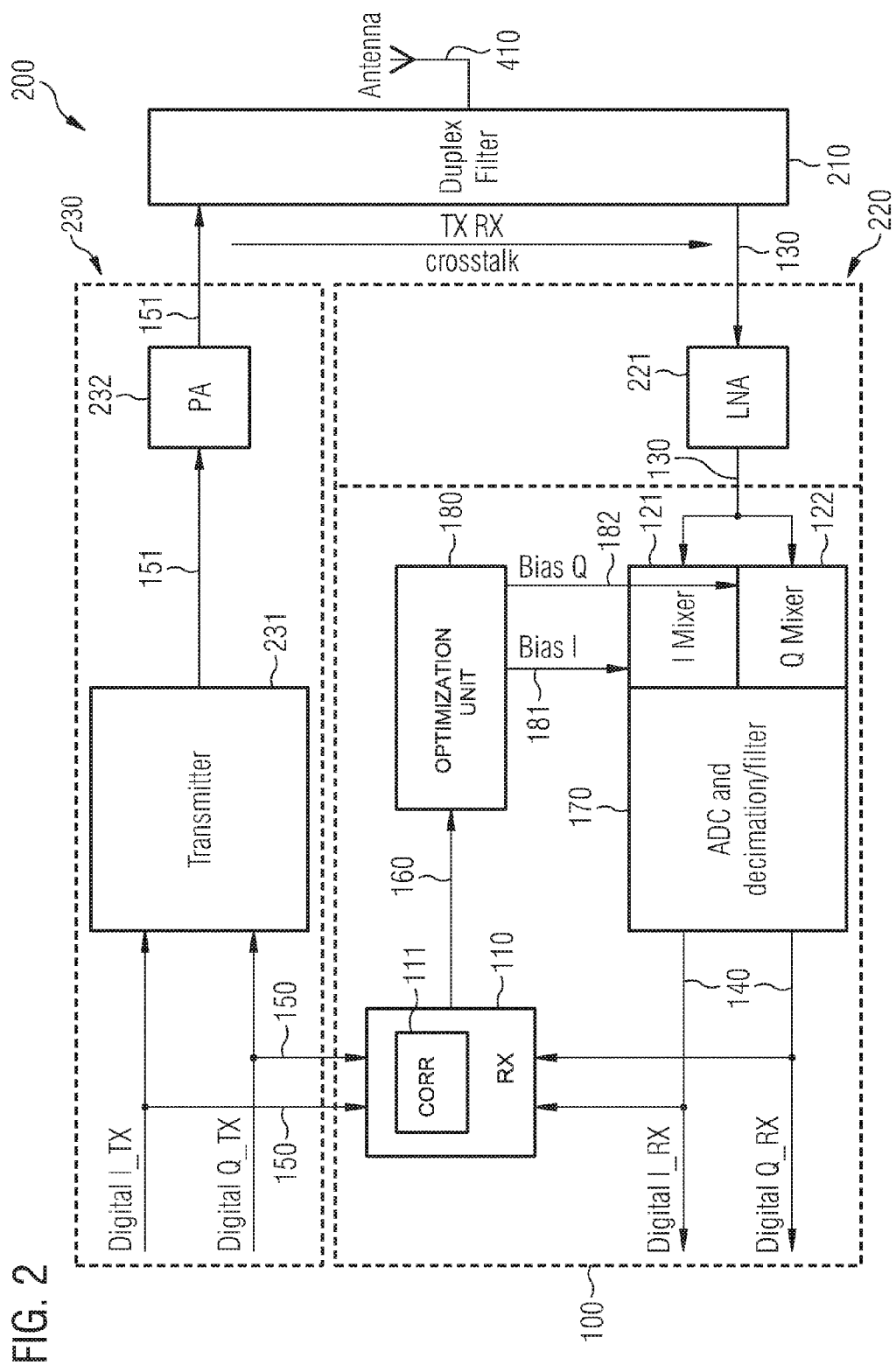
FIG. 2 illustrates an example of a transceiver.

FIG. 2 illustrates an example of a transceiver 200 which comprises an example of a receiver 100. The transceiver 200 may be connected to an antenna element 410. The transceiver 200 comprises a receive path 220 and a transmit path 230. The receive path 220 and the transmit path 230 may be connected to the antenna element 410 via duplexer 210.

The transmit path 230 comprises a transmitter 231 and a Power Amplifier (PA) 232. The transmitter 231 may convert the baseband transmit signal 150 to a radio frequency transmit signal 151. The radio frequency transmit signal 151 may be fed to the PA 232, which may amplify the radio transmit signal 151 and provide it to the duplexer 210 for providing it to the antenna element 410. The baseband transmit signal 150 may be a digital signal. For example, the baseband transmit signal 150 may be represented in a Cartesian representation and may thus comprise an in-phase component (I_TX) and a quadrature component (Q_TX). However, the baseband receive 150 signal is not limited to the above representation and may, for example, also be provided as a polar representation.

The receive path 220 may comprise an amplifier, e.g., a Low Noise Amplifier (LNA) 221, which may amplify a possibly weak signal while adding as little noise and distortion as possible to the signal. A received radio frequency signal 130 may be provided to the LNA 221 by the duplexer 210. The LNA 221 may amplify the received radio frequency signal 130 and provide it to the receiver 100.

The receiver 100 illustrated in FIG. 2 may in general be the receiver 100 as illustrated in FIG. 1. However, an example of a receiver comprised in the example of a transceiver may comprise one or more additional optional features corresponding to one or more aspects of the proposed concept or one or more examples described above or below.

The baseband receive signal 140 may be a digital signal. For example, the baseband receive signal 140 may be represented in a Cartesian representation and may thus comprise an in-phase component (I_RX) and a quadrature component (Q_RX). However, the baseband receive signal 140 is not limited to the above representation. The receiver 100 as illustrated in FIG. 2 comprises a first mixer 121 and a second mixer 122 as examples for a combiner according to examples described herein. The first mixer 121 may, e.g., down-mix the received radio frequency signal 130 to an analog intermediate in-phase signal, which may be input to an Analog-to-Digital Converter (ADC) 170 in order to convert the analog intermediate in-phase signal to the I_RX. Accordingly, the second mixer 122 may, e.g., down-mix the received radio frequency signal 130 to an analog intermediate quadrature signal, which may be input to the ADC 170 in order to convert the analog intermediate quadrate signal to the Q_RX. The ADC 170 may optionally comprise decimation elements which allow to reduce a sample rate of the signals I_RX and Q_RX, respectively. The decimation elements may optionally comprise filter elements in order reduce possible aliasing distortions.

The baseband transmit signal 150 may be provided to a baseband processing unit (not shown) connected to receiver 100 for further processing of the signal.

The transceiver 200 comprises the transmit path 230 and the receive path 220 which may influence each other, especially if both are operative at a time. For example, crosstalk from the transmit path 230 may propagate via to the receive path 220 the duplexer 210 in case that the receive path 220 receives a radio frequency signal via the duplexer 210 at a same instant at which the transmit path 230 transmits a radio frequency transmit signal 151 via the duplexer 210. For example, the duplexer 210 may provide an imperfect isolation between the radio frequency transmit signal 151 and the received radio frequency signal 130. In particular, a strong radio frequency transmit signal 151, e.g., a radio frequency transmit signal 151 having a high signal power, may cause crosstalk in the received radio frequency signal 130, which is provided to the receive path 220. In general, undesired components in the received radio frequency signal 130 may lower a Signal-to-Noise Ratio (SNR) of the received radio frequency signal 130 and consequently also of the baseband receive signal 140. For example, a crosstalk-component in the received radio frequency signal 130 may cause second order IMDs in the baseband receive signal 140 due to the non-linearity of the mixers 121, 122.

In order to reduce distortion components related to the baseband transmit signal 150 in the baseband receive signal 140, the receiver 100 comprises the distortion meter 110. The distortion meter 110 provides the correlation unit 111 with a signal that depends on the baseband receive signal 140 and a signal that depends on the baseband transmit signal 150. The correlation unit 111 may correlate these signals and provide the correlation result 160 to an optimization unit 180. A signal that depends on the baseband receive signal and the baseband transmit signal may, for example, be a copy of those signals. However, the baseband receive signal and the baseband transmit signal may be preprocessed before being used as an input to the correlation unit as signals that depends on the baseband receive signal and the baseband transmit signal, respectively. For the transmit signal, for example, the preprocessing may serve to at least partly mimic the transfer function of the duplexer 210 and the characteristic of the mixers 121 and 122.

A portion of the baseband transmit signal may cause a distortion component within the baseband receive signal. By means of further preprocessing, a portion of the baseband transmit signal transforms into a representation of said portion within the signal that depends on the baseband transmit signal. Likewise, processing of the distortion component within the baseband receive signal (140) may transform the distortion component into a representation of the distortion component within the signal that depends on the baseband receive signal (140). Nonetheless, both of those representations are still related (or causally interrelated) in that they originate from the related signal portions of the baseband transmit signal and of the baseband receive signal.

The optimization unit 180 adjusts the mixers 121, 122 based on the correlation result 160. For example, the optimization unit 180 may provide to the mixers 121, 122 a setting which is associated to the correlation result 160. For example, the settings for the mixers 121 and 122 may comprise bias voltages 181, 182 for both mixers 121 and 122. A bias voltage may in general be applied to a mixer in order to enhance the linearity of the mixer. For example, a respective Digital-to-Analog Converter (DAC) may be used to provide the bias voltages 181, 182 to the mixers 121, 122 based on the correlation result, respectively. The mixers 121, 122 may, e.g., comprise one or more transistor elements, wherein a local oscillator signal is provided to the gate of the transistor element and the received frequency signal 130 is provided to a source of the transistor element. The bias voltage 181, 182 may be applied to the gate of the transistor element to adjust the behavior of the transistor element, e.g., suppressing undesired signal components of the input received radio frequency signal 130 in the output signal of the mixer 121, 122.

The correlation unit 111 may, e.g., correlate a signal that depends on the baseband receive signal 140 and a signal that depends on the baseband transmit signal 150 for a plurality of different settings of the mixers 121 and 122. Accordingly, the correlation unit 111 may provide a plurality of correlation results 160 for the plurality of mixer settings to the optimization unit 180. The optimization unit 180 may select a correlation result 160 from the plurality of correlation results 160 which satisfies a condition. The optimization unit 180 may adjust the mixers 121, 122 based on the selected correlation result. Hence, the optimization unit 180 may provide to the mixers 121, 122 the setting having associated thereto the correlation result 160 satisfying the condition. The condition may, e.g., be that the selected correlation result 160 indicates a lowest distortion component in the baseband receive signal 140 among the plurality of correlation results for the different settings of the mixers 121, 122. For example, the optimization unit 180 may select the correlation result 160 which indicates a lowest correlation between the signal that depends on the baseband receive signal 140 and the signal that depends on the baseband transmit signal 150. The settings for the mixers 121, 122 associated to this correlation result 160 may, e.g., be the bias voltages 181, 182. The chosen bias voltages 181, 182 may be settings which provide an enhanced linearity of the mixers 121, 122. Accordingly, the IIP2s of the mixers 121, 122 may be high for the chosen bias voltages 181, 182.

The optimization unit 180 may, e.g., be implemented as a processing unit or part of a processing unit, in particular as part of processing unit which further includes the distortion meter 110. The optimization unit 180 may further be provided as a firmware rule of a processing unit.

The above adjustment of the mixers 121, 122 may be performed during regular operation of the transceiver 200. For example, the adjustment may be performed during regular transmission and reception operation of the transceiver 200. No dedicated calibration during a stand-by operation of the transceiver 200 is necessary for enhancing the linearity of the mixers 121, 122. Further, a modulated baseband transmit signal may be generated as opposed to conventional approaches relying on a unmodulated carrier signal or a two-tone signal carrier, which may provide for a better result and a baseband receive signal having a higher SNR.

In other words, a digital metric related to the power of the second order IMD component within the desired received signal may be generated. This metric may then be adjusted by a firmware rule to minimize the second order IMD component, thus improving a Signal-to-Noise and Distortion Ratio (SNDR) of the receiver and the overall throughput of the receiver. The firmware may adjust the mixer gate bias dedicated DAC to maximize the IIP2 of the mixer. This calibration may be performed online with active transmission and reception until the desired target is achieved.

Figure 3A:
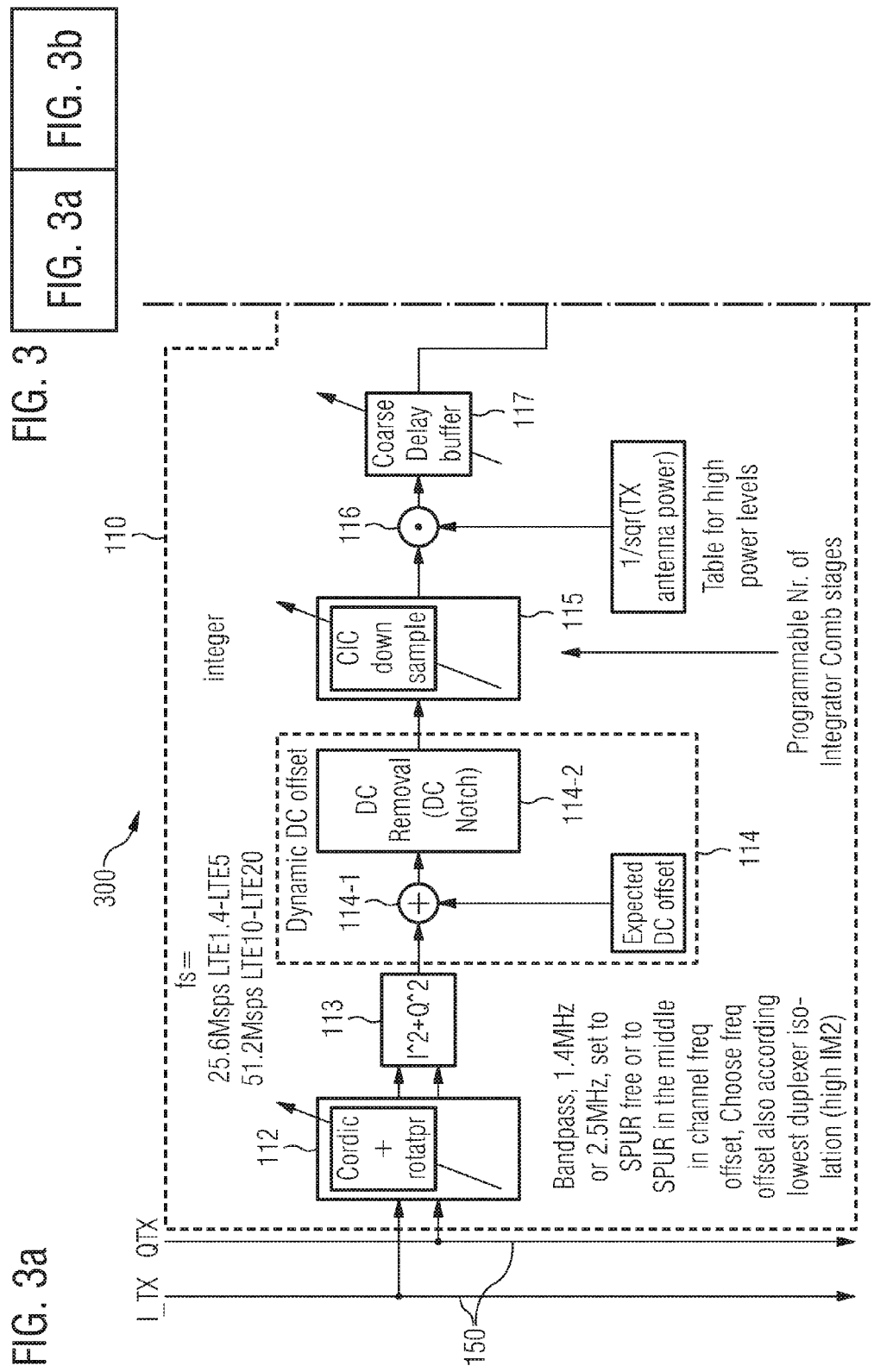
FIGS. 3a and 3b together illustrate an example of a receiver.
Figure 3B:
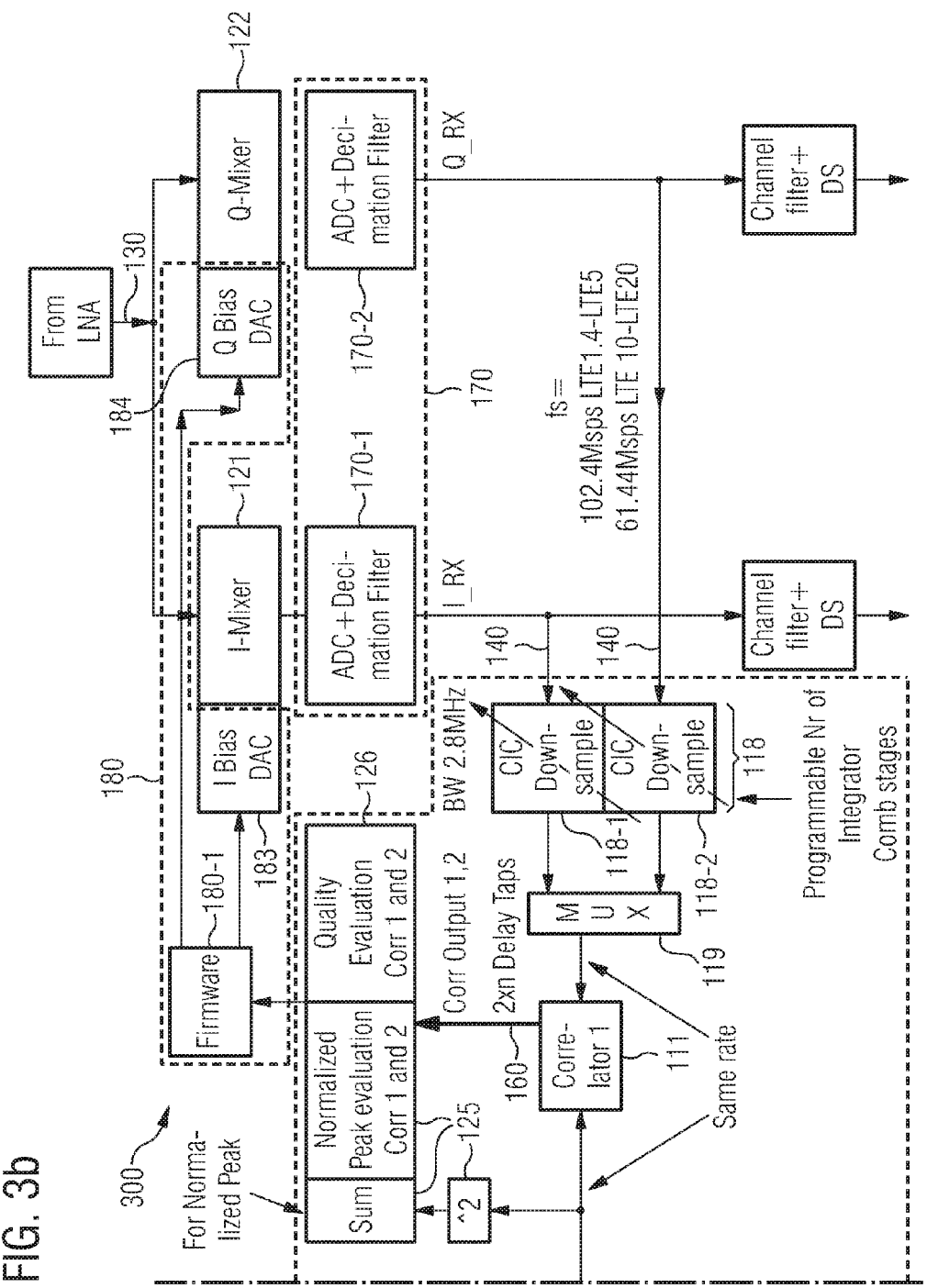

FIG. 3 (split out as FIG. 3a and FIG. 3b) illustrates more detailed the example of a receiver 300. In particular, FIG. 3 illustrates an example of a distortion meter 110.

The distortion meter 110 may comprise a pre-filter 112 having a configurable transfer function and a processing unit 113 having a non-linear transfer function. The pre-filter and the processing unit are used to preprocess the baseband transmit 150 signal to provide the signal that depends on the baseband transmit signal used by the correlator.

The pre-filter 112 may be provided with the baseband transmit signal 150. The pre-filter 112 may allow to approximate the frequency response of the duplexer 210 allowing a part of the radio frequency transmit signal 151 propagating into the received radio frequency signal 130, which is input to the LNA 221, as crosstalk causing. For example, the crosstalk contained in the amplified received radio frequency signal 130 output by the LNA 221 may cause second order IMD in the mixers 121, 122. For example, the pre-filter 112 may allow to approximate the generation of crosstalk (crosstalk frequency response) by the duplexer 210. The pre-filter 112 may replicate significant amplitude and/or phase distortions in the baseband transmit signal 150 which may be caused by the duplexer 210. For a wideband modulated baseband transmit signal 150, the pre-filter 112 may, e.g., provide a spectral sub-set of the input wideband modulated baseband transmit signal 150. For a narrowband modulated baseband transmit signal 150, the pre-filter may, e.g., bypass the input signal. For example, the pre-filter may limit a bandwidth of the baseband transmit signal 150 if necessary. For example, the pre-filter 112 may approximate or mimic the crosstalk frequency response.

For example, the pre-filter 112 may be implemented as a complex filter, e.g., a filter using complex filter coefficients. Alternatively, the pre-filter 112 may be implemented as a complex multiplier, e.g., a mixer, to multiply the baseband transmit signal 150 by a continuous wave tone. The so frequency shifted signal may, for example, be band-pass filtered by two low-pass filter elements having real coefficients. The pre-filter 112 may also employ a CORDIC algorithm (COordinate Rotation Digital Computer) to shift a frequency of the baseband transmit signal 150. The frequency shifted signal may again be band-pass filtered by two low-pass filter elements having real coefficients. However, further other implementations for the pre-filter 112 may be possible.

For determining a best setting for the pre-filter 112 for a specific channel, different settings for the pre-filter 112 may be employed. For example, different configurations of the pre-filters transfer function may be employed. A channel is defined by a combination of a frequency of a Local Oscillator (LO) signal used in the mixers 121, 122 for down-mixing the received radio frequency signal 130 to the baseband receive signal 140 and a frequency of a LO signal used in the transmitter 231 to up-mix the baseband transmit signal 150 to the radio frequency transmit signal 151. As will be apparent for those skilled in the art, the frequencies of both LO signals may be related to frequency bands used for transmission and reception of data, respectively. The frequencies of the LO signals may for example differ for different LTE frequency bands or combinations thereof.

For example, three different filter settings may be employed for the specific channel and the baseband transmit signal 150 may be pre-filtered using the three different filter settings for the pre-filter 112. A correlation result 160 may be determined for each of the three filter settings for the pre-filter 112 and the filter setting having associated thereto the correlation result 160 indicating the highest correlation quality may subsequently be used for the specific channel. The correlation result 160 having the highest correlation quality may indicate a setting for the pre-filter 112 having a most dominant distortion component in the baseband receive signal 140 among the different filter settings for the pre-filter 112. In other words, the filter setting having associated thereto the correlation result 160 having the highest correlation is a setting which replicates or approximates the frequency response of the duplexer 210 best. However, the number of different filter settings used for determining a best filter setting is not limited to three. Any other suitable number of different filter setting may be used. Moreover, there may be other criteria for determining a best setting for the pre-filter 112.

In other words, the pre-filter 112 may provide in cases of wideband modulation of the baseband transmit signal a spectral subset of the baseband transmit signal by the usage of band-pass filtering, in narrowband baseband transmit signal cases it may do a bypass or through. The band-pass may be realized as a complex filter (using complex filter coefficients) or by using a frequency shift by multiplying the baseband transmit signal by a continuous wave tone and a complex multiplier (mixer) followed by 2 low pass filters with real coefficients or by using a CORDIC for the frequency shift combined followed by 2 low pass filters with real coefficients. The reason for using this filter may be to minimize effects of the frequency response of the transmit to the receive port, caused by the duplexer transfer function. The duplexer may introduce significant magnitude/phase linear distortion to the baseband transmit data input to the LNA. The transmit signal that inputs the receive LNA is shaped by this duplexer response, which is then squared within the mixer to generate the second order IMD component. The pre-filter may, for example, select a portion of the frequency spectrum that has highest transmit to receive crosstalk or may approximate or mimic a significant portion of the crosstalk frequency spectrum so as to be able to achieve a good correlation. Without the pre-filter, wideband transmit signals may result in poor distortion meter performance.

As the baseband transmit signal 150 may be represented with an in-phase (I) and a quadrature (Q) component as illustrated in FIG. 3, the pre-filter 112 may perform the above processing for both components of the baseband transmit signal 150 individually.

A signal related to the baseband transmit signal 150 is output (for the in-phase and the quadrature component) by the pre-filter 112 and fed to the processing unit 113, which may have a non-linear transfer function. For example, the processing unit 113 may comprise a squaring unit 113, which may build an envelope of the signal related to the baseband transmit signal 150. For the baseband transmit signal being represented by its in-phase and its quadrature component, the envelope may be determined by summing the squared in-phase component and the squared quadrature component.

The squaring unit 113 may generate a signal which comprises a distortion component similar to that generated in the mixers 121, 122 from the received radio frequency signal 130. For example, ideal mixers 121, 122 may have a perfect isolation between an input port for the received radio frequency signal 130 and an input port for the LO signal used for down-mixing the received radio frequency signal 130. However, the isolation between both input ports may be imperfect for the mixer 121, 122 in reality. Accordingly, the received radio frequency signal 130 may be input not only to its dedicated input port but also to the input port dedicated to the LO signal. Accordingly, an output signal of the mixers 121, 122 may comprise a squared component of the received radio frequency signal 130. Since the received radio frequency signal 130 may comprise a crosstalk-component related to the radio frequency transmit signal 151, also this crosstalk-component may be squared in the mixers 121, 122 causing distortion components, e.g., second order IMD components, in the baseband receive signal 140.

Since the signal provided by the pre-filter 112 to the squaring unit 113 may have been processed in the pre-filter 112 by a transfer function which is similar that of the duplexer 210, the envelope signal built by squaring in the squaring unit 113 may comprise a distortion component which is similar to that generated in the mixers 121, 122 from the received radio frequency signal 130.

In other words, the pre-filter is followed by a squaring block 113 building the squared envelope of the output narrowband signal ($=I^2+Q^2$).

The output of the squaring unit 113, which represents the squared envelope of the signal related to the baseband transmit signal 150, may be fed to an offset correction unit 114 configured to modify an amplitude of the signal that depends on the baseband transmit signal 150 by a mean amplitude of the signal that depends on the baseband transmit signal 150.

The offset correction unit 114 may, e.g., comprise a subtraction element 114-1. The subtraction element may, for example, subtract a mean amplitude of the signal that depends on the baseband transmit signal 150 from an amplitude of the signal that depends on the baseband transmit signal 150. The mean amplitude of the signal that depends on the baseband transmit signal 150 may be determined by the subtraction element 114-1 or may be provided to the subtraction element 114-1. Accordingly, an amplitude offset (DC) of the signal that depends on the baseband transmit signal 150 may be removed from the signal that depends on the baseband transmit signal 150. The offset correction unit 114 may further comprise offset filter 114-2. The offset filter 114-2 may remove residual DC from the signal that depends on the baseband transmit signal 150.

In other words, the output signal of the squaring block 113 may be input to a subtraction block 114-1 followed by DC removal filter 114-2, where the mean envelope value may be subtracted and a high-pass filter may be used to remove the residual DC that has not been removed by the subtraction block 114-1.

Moreover, the distortion meter 110 may further comprise a first sample rate converter 115, which may provide the signal that depends on the baseband transmit signal 150 with a common sample rate. The common sample rate may be identical to or different from a sample rate of the baseband transmit signal 150. The first sample rate converter 115 is provided with the signal that depends on the baseband transmit signal 150 output by the offset correction unit 114.

The bandwidth of the signal that depends on the baseband transmit signal 150 may, e.g., be reduced due to the pre-filtering in pre-filter 112 and/or a low resource block allocation in the signal. Hence, a sample rate of the signal that depends on the baseband transmit signal 150 may, e.g., be reduced compared to a sample rate of the baseband transmit signal 150. For example, the sample rate of the signal that depends on the baseband transmit signal 150 may be reduced compared to a sample rate of the baseband transmit signal for an Orthogonal Frequency-Division Multiplexed (OFDM) signal with a low resource block allocation. Hence, computing power and energy may be saved in subsequent processing units due to the lower sample rate.

However, the sample rate of the signal that depends on the baseband transmit signal 150 output by the first sample rate converter may also be a same sample rate as that of the baseband transmit signal 150 or a higher sample rate different from the sample rate of the baseband transmit signal 150.

The first sample rate converter 115 may, for example, be implemented as a Cascaded-Integrator-Comb (CIC) filter. The first sample rate converter 115 may be able to convert multiple sample rates for various combinations of bandwidths of frequency bands used for transmission and reception by the transceiver 200. For example, the first sample rate converter 115 may be able to convert a plurality of sample rates related to bandwidth combinations of different LTE or UMTS (Universal Mobile Telecommunications System) frequency bands used for transmission and reception by the transceiver 200.

The sample rate of the signal output by the first sample rate converter 115 may be a common sample rate to which also a sample rate of the signal that depends on the baseband receive signal 140 may be converted.

In other words, the output of the subtraction block 114 is connected to a CIC down-sampling block 115. Due to pre-filtering or low resource block allocation, the signal bandwidth may be reduced and may in some examples not need the high sampling rate, which may save effort on the following blocks, especially the correlator and the number of lags needed. This CIC filter may support multiple sample rates for all LTE and UMTS bandwidth combinations.

The distortion meter 110 may further comprise a normalization unit 116 configured to normalize the signal that depends on the baseband transmit signal 150 using an output power of the amplifier 232 for amplifying the radio frequency transmit signal 151 generated from the baseband transmit signal 150. For example, an amplitude of the signal that depends on the baseband transmit signal 150 may be normalized by dividing it by the square of the power of the radio frequency transmit signal 151.

The normalization unit 116 may allow to avoid dependencies of the correlation result 160 on the output power of the PA 232. The correlation result 160 may be proportional to the IIP2 of the receiver 100, but may in some examples not depend on the power of the radio frequency transmit signal 151 provided to the duplexer 210.

In other words, block 116 may do the normalization to avoid dependencies of the distortion meter result on the power amplifier output power. The distortion meter may deliver a signal, indicative of the receiver IIP2 as output information, independent of radio frequency transmission signal output power.

The normalized signal that depends on the baseband transmit signal 150 may be fed to an alignment unit 117 configured to provide to the correlation unit 111 a part of the signal that depends on the baseband transmit signal 150. The provided part may correspond to the part of the signal that depends on the baseband receive signal 140 which is a portion of the second order IMD spectrum of the mixers 121, 122. In other words, the alignment unit 117 timely aligns the signal that depends on the baseband receive signal 140 and the signal that depends on the baseband transmit signal 150 such that a representation of the distortion component within the signal that depends on the baseband receive signal 140 and a related representation of the baseband transmit signal 150 within the signal that depends on the baseband transmit signal 150 are provided at a same time instant to the correlation unit 111.

In the correlation unit 111, the signal that depends on the baseband transmit signal 150 is correlated with the signal that depends on the baseband receive signal 140 for determining a power of a distortion component in the baseband receive signal 140. The distortion component in the baseband receive signal 140 may be related to the baseband transmit signal 150. Therefore, the signal that depends on the baseband transmit signal 150 may depend on a specific part of the baseband transmit signal 150 that causes the distortion component in the baseband receive signal 140. The distortion component in the baseband receive signal 140 may be generated in the mixers 121, 122 due to the crosstalk-component in the received radio frequency signal 130 caused by the radio frequency transmit signal 151, which may be generated in the transmitter 231 from the baseband transmit signal 150. Accordingly, a run-time of the specific part of the baseband transmit signal 150 through the transmitter 231, the PA 232 (as radio frequency transmit signal 151), the duplexer 210 and as crosstalk component of the received radio frequency signal 130 to the correlation unit 111 may be aligned to a run-time of the specific part of the transmit signal 150 through the pre-filter 112, the processing unit 113, the offset correction unit 114, the first sample rate converter 115 and the normalization unit 115. For example the run-time through the pre-filter 112, etc. may be shorter than the run-time through the transmitter 231, etc., so that the specific part of the baseband transmit signal 150 contained in the signal that depends on the baseband transmit signal 150 might be provided to the correlation unit 111 at a different instant of time than the corresponding specific part contained in the signal that depends on the baseband receive signal 140. Accordingly, the signal that depends on the baseband transmit signal 150 may be delayed before providing it to the correlation unit 111. For example, the alignment unit 117 may be implemented as a delay buffer. The alignment unit 117 may delay the signal that depends on the baseband transmit signal 150.

In other words, delay block 117 may time align receive and transmit data if needed.

The (delayed) signal that depends on the baseband transmit signal 150 may be provided to the correlation unit 111. Furthermore, the signal that depends on the baseband receive signal 140 may be provided to the correlation unit 111.

The baseband receive signal 140 may be generated by the mixers 121, 122 and the ADC 170 as describe above. The ADC 170 may comprise two ADC elements 170-1 and 170-2 for converting the analog output of the mixers 121, 122 to the digital baseband receive signal 140 comprising an in-phase and a quadrature component.

The signal that depends on the baseband transmit signal 140 may be generated from the baseband transmit signal 140 by a second sample rate converter 118. The second sample rate converter 118 may provide the signal that depends on the baseband receive signal 140 with the common sample rate based on the baseband receive signal 140. As the baseband receive signal may comprise an in-phase and a quadrature component, the second sample rate converter 118 may comprise two sample rate conversion elements 118-1 and 118-2 for the respective components of the baseband receive signal 140. Similar to the first sample rate converter 115, the second sample rate converter 118 may be implemented as a CIC filter. As the baseband receive signal 140 may be represented by its in-phase component and its quadrature component, a separate second sample rate converter element 118-1 may be provided for the in-phase component and a separate second sample rate converter element 118-2 may be provided for the quadrature component.

In other words, the ADC 170 output may be filtered with an independent CIC filter to obtain the same sample rate as the transmission signal input into the correlator 111. This receive CIC filter may also provide sufficient interferer protection and noise removal during the correlation process.

The signals having the common sample rate for the in-phase component and the quadrature component of the baseband receive signal 140 may be provided to a multiplexer 119 to generate a serial signal from the parallel signals for the in-phase component and the quadrature component. The signal that depends on the baseband transmit signal 150 as generated by multiplexer 119 may be provided to the correlation unit 111.

For example, a single correlation unit 111 may be used to correlate the in-phase and the quadrature component of the signal that depends on the baseband receive signal 140 with the signal that depends on the baseband transmit signal 150 since both components are provided serially to the correlation unit 111. If both components were processed in parallel, a separate correlation unit 111 and separate elements for providing the signal that depends on the baseband transmit signal 150 would have to be provided for both components. Moreover, the receiver 300 may comprise further mixers, e.g., for carrier aggregated signals or Multiple Input Multiple Output (MIMO) operation of the receiver 300. The outputs of all mixers may be multiplexed by the multiplexer 119 and provided to the correlation unit 111. Accordingly, merely a work cycle of the correlation unit 111 may be increased in order to correlate the signals from the plurality of mixers with a single signal that depends on the baseband transmit signal. Using the multiplexer 119 to generate a serial signal may allow to reduce energy consumption and required space on a chip which includes the receiver 300.

The correlation unit 111 may correlate the signal that depends on the baseband receive signal 140 and the signal that depends on the baseband transmit signal 140. The signal that depends on the baseband transmit signal 150 may contain a distortion component which is equivalent or similar to the distortion component comprised in the baseband receive signal 140 due to the non-linearity of the mixers 121, 122. The signal that depends on the baseband receive signal 140 may contain a desired receive signal component and the distortion component caused by the non-linearity of the mixers 121, 122.

The correlation unit 111 may correlate the signal that depends on the baseband transmit signal 150 and the signal that depends on the baseband receive signal 140 for a given time instant. For example, the correlation unit 111 may correlate both signals over the duration of a slot for Wideband Code Division Multiple Access (WCDMA) signals or over the duration of a sub-frame for LTE signals. That, a discrete correlation may be performed using the samples contained in, e.g., a slot or a sub-frame of both signals.

The correlation unit 111 may, e.g., cross-correlate the signal that depends on the baseband transmit signal 150 and the signal that depends on the baseband receive signal 140. For example, a discrete correlation may be performed which indicates a similarity between both signals. The discrete correlation may be determined for different time lags between both signals. The discrete correlation for each time lag may indicate a correlation energy between the signal that depends on the baseband receive signal 140 and the distortion component in the signal that depends on the baseband transmit signal 150. A single discrete correlation may comprise a series of correlation sample values. A correlation sample value of the discrete correlation having a maximum amplitude may be referred to as peak value and may indicate a highest correlation energy between the signal that depends on the baseband receive signal 140 and the distortion component in the signal that depends on the baseband transmit signal 150. The discrete correlations for the different time lags between both signals may be output by the correlation unit 111 as the correlation results 160. The correlation results 160 may comprise an amplitude and a sign representative of the correlation energy between the signal that depends on the baseband receive signal 140 and the distortion component in the signal that depends on the baseband transmit signal 150.

Since the signal that depends on the baseband receive signal 140 is a serial signal comprising components for the in-phase component and the quadrature component of the baseband receive signal 140, separate correlation results 160 for the in-phase component and the quadrature component may be determined.

In other words, the two inputs to the correlation block may be: the received signal that may be low-pass filtered and operating at a lower sample rate, and which may contain the second order IMD component and a desired receive signal component; and a pre-filtered complex transmit I/Q data operating at a lower sample rate, which may contain a reference second order IMD component. A correlation may be performed between the two filtered transmit/receive data specified above. The correlation may be performed over the duration of a slot (for WCDMA) or a sub-frame (for LTE). At the end of the correlation period, each correlator lag will generate a metric, representative of the correlation energy between the receive signal data and the reference second order IMD component. The maximum peak from all correlator lags may direct a firmware rule to the correlator lag with the most correlation energy.

The distortion meter 110 may further comprise a correlation normalization unit 125. The correlation normalization unit 125 may normalize the correlation result 160 using a signal power of the signal depending baseband transmit signal 150. Normalizing the correlation result 160 may be applied in order to account for different bandwidths of the baseband transmit signal 150 provided to the pre-filter 112. Moreover, normalization may, e.g., be applied in order to account for different possible combinations of bandwidths of frequency bands used in LTE communication.

In other words, the final correlation peak may be normalized by the power of the correlator transmit input data. This normalization may be required by the different bandwidth combinations of the pre-filter 112 and LTE bandwidth combinations.

The distortion meter may further comprise a correlation quality unit 126. The correlation quality unit 126 may determine a correlation quality indicator (CQI) which indicates a power of the distortion component in the baseband receive signal 140. The correlation quality indicator may get the correlation results 160 from the correlator 111 or the normalized correlation results 160 from the correlation normalization 125 as input.

The CQI may be based on a relation between a best correlation and a second best correlation between the signal that depends on the baseband receive signal 140 and the signal that depends on the baseband transmit signal 150. For example, a ratio between the best correlation result 160 and the second best correlation result 160 may be determined as the CQI. The best correlation result may, e.g., be a peak value of a discrete correlation for a first time lag having a highest amplitude value among all discrete correlations determined by the correlation unit 111 for the different time lags. The second best correlation may, e.g., be a peak value of a discrete correlation for a second time lag different from the discrete correlation for the first time lag having a highest amplitude value among all discrete correlations determined by the correlation unit 111 without the discrete correlation for the first time lag associated to the best correlation result. The CQI may, e.g., be calculated as the ratio of the peak values of the best and the second best correlations 160.

In other words, the best correlation result may be associated to a first correlation peak and the second best correlation may be associated to a second correlation peak. Each peak may be several time lags wide, e.g., each peak may comprise several taps. In order to ensure that the second best correlation result is associated to the second correlation peak but not to a sample of the first correlation peak having a second highest overall amplitude value, windowed intervals may be used for determining the second best correlation result. Windowed intervals may generally be used for determining the peak values.

Since separate correlation results 160 may be determined for the in-phase and the quadrature component of the baseband receive signal 140, separate CQIs for the in-phase and the quadrature component may be determined by the correlation quality unit 126.

In other words, the CQI may be the ratio of the main peak of the correlation to the side lobe peak of the correlation, representative of the noise. The correlation quality unit 126 may generate a CQI for both I and Q channels.

Alternatively, the CQI may be based on a relation between a best correlation and an average correlation between the signal that depends on the baseband receive signal 140 and the signal that depends on the baseband transmit signal 150. For example, a ratio between the best correlation result 160 and a mean value of the different correlation results 160 for the different time lags may be determined as the CQI. In another example, a ratio between the best correlation result 160 and a mean value of the absolute values of different correlation results 160 without the best correlation result 160 may be determined as the CQI. Similar to the above method for determining the CQI, the best correlation result may, e.g., be a peak value of a discrete correlation for a first time lag with a highest amplitude value among the peak values of all discrete correlations determined by the correlation unit 111 for the different time lags. The average correlation result may, e.g., be an average absolute peak value (sign removed) of the discrete correlations determined by the correlation unit 111 for the different time lags. Alternatively, the average correlation result may, e.g., be an average absolute peak value of the discrete correlations determined by the correlation unit 111 for the time lags different from the first time lag associated to the best correlation result. For example, selected correlation results 160 may be used for determining the CQI. The mean value of the different correlation results 160 may, e.g., be determined by determining a Root Mean Square (RMS) of the peak values of the different correlation results 160.

The ratio of the best correlation result 160 to the second best correlation result 160 or an average correlation result 160 may be representative of a power of the distortion component in the baseband receive signal 140. For example, the best correlation result 160 may be dominant compared to the second best correlation result 160 or an average correlation result 160 if the power of the distortion component in the baseband receive signal 140 is high. Moreover, the best correlation result 160 may be equal to or similar to the second best correlation result 160 or an average correlation result 160 if the power of the distortion component in the baseband receive signal 140 is low. Accordingly, a high CQI value may indicate high power of the distortion component in the baseband receive signal 140, whereas a low CQI value may indicate low power of the distortion component in the baseband receive signal 140.

The CQI may therefore be used as an indicator whether or not the settings of the mixers 121, 122 should be adjusted in order to reduce the distortion component in the baseband receive signal 140. In other words, if the CQI is high, optimization may be performed.

Furthermore, the CQI may be used for determining the best setting for the pre-filter 112 (e.g., before actually optimizing the setting for the mixers 121, 122) since a high CQI value may indicate that a correlation between the signal that depends on the baseband receive signal 140 and the distortion component in the signal that depends on the baseband transmit signal 150 is high. Accordingly, a high CQI value may indicate a distortion component in the signal that depends on the baseband transmit signal 150 which replicates the distortion component in the baseband receive signal 140 well. The distortion component in the signal that depends on the baseband transmit signal 150 may be determined by the settings of the pre-filter 112, so that a high CQI value may indicate a superior setting for the pre-filter 112. For example, CQIs may be determined for different settings of the pre-filter 112 and the setting having associated thereto the highest CQI value may be used for the pre-filter. However, the determination of the best setting for the pre-filter 112 is not limited to the above example.

The normalized correlation results 160 may further be provided to the optimization unit 180. The optimization unit 180 may comprise a correlation optimization unit 180-1. The correlation optimization unit 180-1 may determine an optimum correlation result 160 which indicates a highest correlation energy between the signal that depends on the baseband receive signal 140 and the distortion component in the signal that depends on the baseband transmit signal 150 out of the plurality of normalized correlation results 160 provided by the correlation normalization unit 125 for the different time lags. The optimum correlation result may be determined similar to the best correlation result 160 determined in the correlation quality unit 126. Alternatively, the best correlation result 160 may be provided to the optimization unit 180 by the correlation quality unit 126 and may be used by the optimization unit 180 as optimum correlation result. Further alternatively, the optimum correlation result may be provided to the correlation quality unit 126 by the optimization unit 180 and may be used by the correlation quality unit 126 as the best correlation result.

The optimum correlation result 160 may be associated to a specific setting for both mixers 121, 122. For example, the optimum correlation result 160 may be associated to bias voltages 181, 182 for the mixers 121, 122.

In order to reduce the distortion component in the baseband receive signal, the bias voltages 181, 182 for the mixers 121, 122 may be adjusted based on the optimum correlation result 160. The correlation optimization unit 180-1 may, e.g., provide control signals to first DAC 183 and second DAC 184 based on the optimum correlation result 160. The first DAC 183 may use the control signal to generate a bias voltage 181 for biasing the first mixer 121 and the second DAC 184 may use the control signal to generate a bias voltage 182 for biasing the second mixer 122.

For example, a plurality of optimum correlation results 160 may be determined by the correlation optimization unit 180-1 for different bias voltages 181, 182 for the mixers 121, 122. For example, different bias voltages 181, 182 in the vicinity of expected ideal bias voltages 181, 182 for the mixers 121, 122 may be used. A search may be performed among the plurality of optimum correlation results 160 in order to find bias voltages 181, 182 for the mixers 121, 122 associated to an optimum correlation result 160 which indicates a lowest correlation energy between the signal that depends on the baseband receive signal 140 and the distortion component in the signal that depends on the baseband transmit signal 150 among the plurality of best correlation results 160. This optimum correlation result 160 may indicate a lowest power of the distortion component in the baseband receive signal 140. For determining the correlation result 160 which indicates a lowest power of the distortion component in the baseband receive signal 140 not only an amplitude of the optimum correlation results 160 may be used but also the sign of the optimum correlation results 160 may be used. For example, the optimum correlation results 160 may be converted to complex powers by the correlation optimization unit 180-1 and a 2D binary search may be performed in order to find a minimum complex power. However, there may be various other methods for determining the optimum correlation result 160 which indicates a lowest power of the distortion component in the baseband receive signal 140.

Determining correlation results 160 for different settings of the mixers 121, 122 may be carried out iteratively until a condition is satisfied. For example, the condition may be that the CQI does not indicate a strong correlation between the baseband receive signal 140 and the distortion component in the signal that depends on the baseband transmit signal 150. For example, the CQI has a low value. However, various other conditions may be used.

The bias voltages 181, 182 for the mixers 121, 122 which are associated to the optimum correlation result 160 indicating a lowest power of the distortion component in the baseband receive signal 140 may be stored and used for subsequent operation of the receiver 300. The control signals for the DACs 183, 184 of the mixers 121, 122 may be saved to a memory for use in subsequent operation of the receiver. In particular, settings for the mixers 121, 122 may be determined and saved for each receive channel of the receiver 300. For example, bias voltages 181, 182 for the mixers 121, 122 may be determined which provide an improved linearity of the mixers 121, 122. Accordingly, the IIP2s of the mixers 121, 122 may be improved by the determined bias voltages 181, 182 for the mixers 121, 122. Hence, a distortion component in the baseband receive signal 140 may be reduced. In particular, a second order IMD component in the baseband receive signal 140 caused by the non-linearity of the mixers 121, 122 may be reduced.

In other words, the maximum peak from all correlator lags may direct the firmware rule, which may be implemented as algorithm, to the correlator lag with the most correlation energy. The firmware rule may utilize the normalized correlator peaks for I_RX and Q_RX path as the input to a 2D binary search operating on the mixer IIP2 I/Q DACs. The firmware may convert this correlation results (for I_RX and Q_RX) to a combined power and optionally to a combined CQI, which may be minimized with the binary 2D search. The mixer IIP2 DACs may be adjusted until the combined CQI no longer indicates a strong correlation energy between the second order IMD component in the baseband receive signal and the reference second order IMD component in the transmit signal. The final mixer I/Q IIP2 DAC values may be saved to memory for the desired receive channel to be utilized for a subsequent receive operation.

The foregoing processing may be carried out during regular transmission and reception of signals in the transceiver 200. In other words, a calibration may be performed online with the active transmission and reception of signals until the desired target is achieved.

However, the foregoing processing may, e.g., not be carried out continuously. Especially, the processing may be restricted to scenarios where certain pre-conditions are fulfilled. For example, one condition may be that the signal power of the radio frequency transmit signal 151 lies above a first threshold. For example, the radio frequency transmit signal 151 may have a high signal power. Moreover, the signal strength of a received narrow-band radio frequency signal 130 may be below a second threshold. In particular, a signal strength of a wanted signal component in the baseband receive signal 140 may be low if a signal strength of the received radio frequency signal 130 is lower than a than a signal strength of the distortion component in the baseband receive signal 140. Further, the signal strength of a received wideband radio frequency signal may be above a third threshold determined by the above required signal strength for a received narrow-band radio frequency signal 130 and an interferer threshold. Moreover, the above processing may in some examples not be carried out if the duplexer 210 of the transceiver 200 is operated as a Time Division Duplexer (TDD) Radio Access Technology (e.g., Global System for Mobile Communications (GSM), Time Division Synchronous Code Division Multiple Access (TD-SCDMA), TDD LTE) is at least temporarily used since a radio frequency transmit signal 151 and a received radio frequency signal 130 may be processed by the duplexer 210 not at a same time instant, so that no distortions related to the baseband transmit signal 130 may be generated in the baseband receive signal 140 during an active receive slot.

In other words, the components may be active when certain operating conditions are met, otherwise they may be disabled. Exemplary operating conditions may be: radio frequency transmit signal power>TX_Threshold (dBm) (strong radio frequency transmit signal may generate significant second order IMD component in the baseband receive signal 140); Received Signal Strength Indication (RSSI) of received radio frequency signal 130<RX_Threshold (dBm) (weak desired receive signal, where a receiver bit error rate is expected to suffer from IMD influence).

Firmware rule related inputs/outputs, which may be useful or necessary for the distortion meter may be summarized as follows: basic distortion meter input may be I_TX, Q_TX, I_RX and Q_RX; basic distortion meter/calibration output may be I_RX mixer Bias, Q_RX mixer Bias, normalized correlation result, CQI (Correlation Quality Indicator), Corrpeak (Correlation Peak) and Sum(TX_corr_input^2) for result normalization; further distortion meter/calibration related information may be RAT, if LTE then also LTE mode and TX resource block allocation, CA, MIMO, Slot start, Slot end, Correlation period, Calib start, Calib stop, Calib state request, Time management for re-iterations, Management of I and Q Mixer Bias boundaries for each Iteration, TX power, Pre-ADC gain (LNA Gain), RSSI, WRSSI, TX frequency, RX LO frequency, Learning Tables, TX pre-filter bandwidth, TX pre-filter f0, CIC decimation on TX side, CIC decimation on RX side, I_RX Mixer Bias, Q_RX Mixer Bias, I_TX, Q_TX.

The example of a receiver 300 may comprise one or more additional optional features corresponding to one or more aspects of the proposed concept or one or more examples described above or below.

Figure 4:
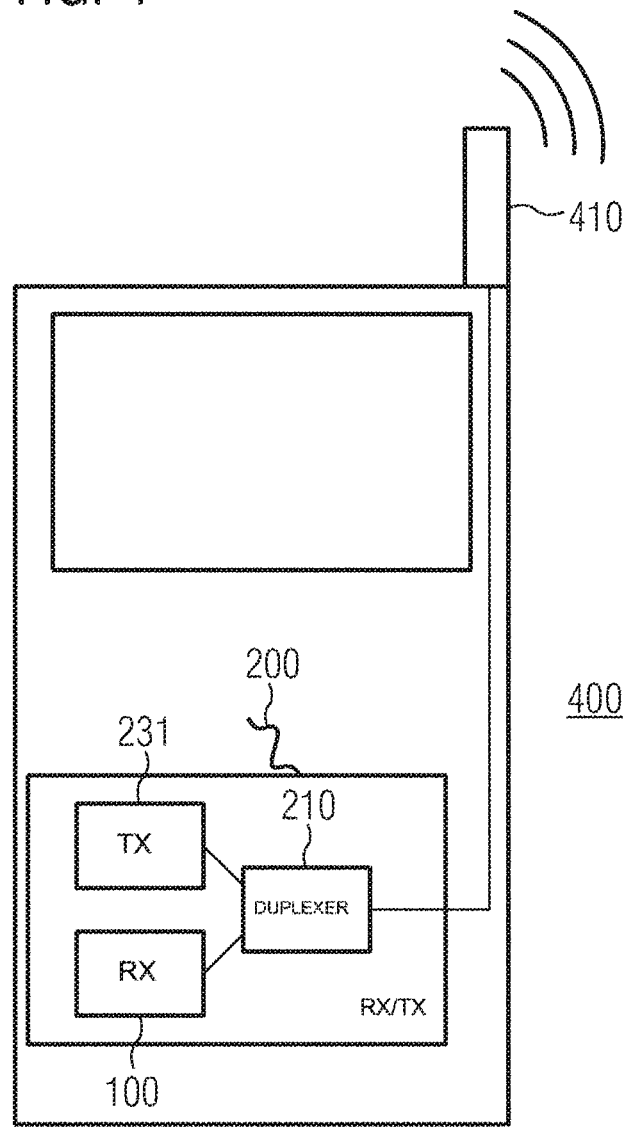
FIG. 4 illustrates an example of a mobile communications device comprising an example of a receiver.

FIG. 4 schematically illustrates an example of a mobile communications device or mobile phone or user equipment 400 comprising a receiver according to an example described herein (e.g., the example of a receiver 100 illustrated in FIG. 1). The receiver 100 and a transmitter 231 are comprised in a transceiver 200 of mobile communications device 400. The receiver 100 and the transmitter 231 may be coupled to a duplexer 210. An antenna element 410 of mobile communications device 400 may be coupled to the duplexer 210 of the transceiver 200 to provide a received radio frequency signal to the transceiver 200. To this end, mobile communications devices may be provided having a reduced distortion component related to a baseband transmit signal in a baseband receive signal.

The example of a mobile communications device 400 may comprise one or more additional optional features corresponding to one or more aspects of the proposed concept or one or more examples described above or below.

Figure 5:
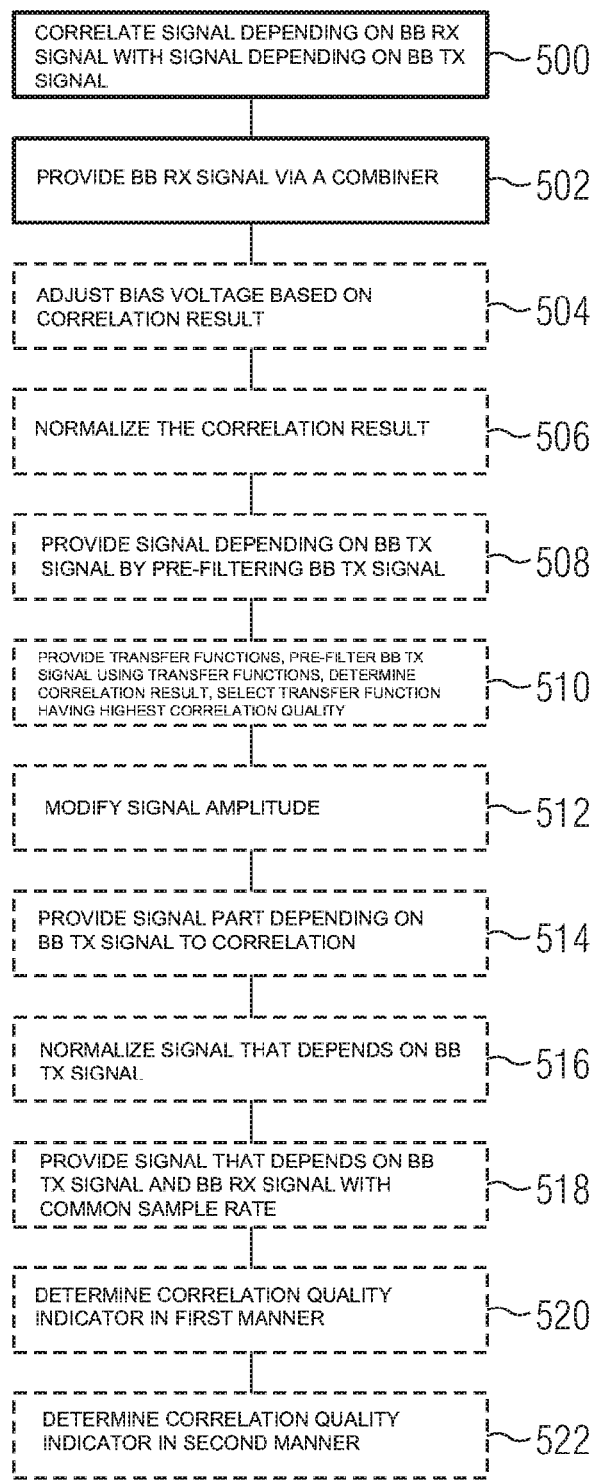
FIG. 5 illustrates a flowchart of an example of a method for reducing a distortion component in a received signal.

An example of a method for reducing a distortion component in a baseband receive signal is illustrated by means of a flowchart in FIG. 5. The method comprises correlating 500 a signal that depends on the baseband receive signal and a signal that depends on the baseband transmit signal; and providing 502 the baseband receive signal by means of a combiner using the received radio frequency signal and a plurality of settings based on a correlation result. The plurality of settings may comprise a bias voltage of the combiner. The method may thus optionally comprise adjusting 504 the bias voltage based on the correlation result.

The method may further optionally comprise normalizing 506 the correlation result using a signal power of the signal that depends on the baseband transmit signal.

Optionally, the method may further comprise providing 508 the signal that depends on the baseband transmit signal by pre-filtering the baseband transmit signal using a configurable transfer function and processing the baseband transmit signal using a non-linear transfer function.

The method may further optionally comprise the following processing 510: providing a plurality of configurable transfer functions; pre-filtering the baseband transmit signal using the plurality of configurable transfer functions; determining a correlation result for each of the plurality of configurable transfer functions; and selecting the configurable transfer function having associated thereto the correlation result having the highest correlation quality.

Optionally, the method may further comprise modifying 512 an amplitude of the signal that depends on the baseband transmit signal by a mean amplitude of the signal that depends on the baseband transmit signal.

The method may further optionally comprise providing 514 to the correlation a part of the signal that depends on the baseband transmit signal corresponding to a part of the baseband transmit signal the distortion component in the baseband receive signal is related to at a same instant than a part of the signal that depends on the baseband receive signal corresponding to a part of the baseband receive signal which comprises the distortion component.

Optionally, the method may further comprise normalizing 516 the signal that depends on the baseband transmit signal using an output power of an amplifier for amplifying a radio frequency transmit signal generated from the baseband transmit signal.

Optionally, the method may further comprise the following processing 518: providing the signal that depends on the baseband transmit signal with a common sample rate which is a same as or different than a sample rate of the baseband transmit signal; and providing the signal that depends on the baseband receive signal with the common sample rate.

The method may optionally further comprise determining 520 a correlation quality indicator which indicates an amount of the distortion component in the received radio frequency signal based on a relation between a best correlation and a second best correlation between the signal that depends on the baseband receive signal and the signal that depends on the baseband transmit signal.

Optionally, the method may further comprise determining 522 a correlation quality indicator which indicates an amount of the distortion component in the received radio frequency signal based on a relation between a best correlation and an average correlation between the signal that depends on the baseband receive signal and the signal that depends on the baseband transmit signal.

More details and aspects of the method are mentioned in connection with the proposed concept or one or more examples described above or below (e.g. FIG. 1-4). The method may comprise one or more additional optional features corresponding to one or more aspects of the proposed concept or one or more examples described above or below.

The examples as described herein may be summarized as follows:

Example 1 is a receiver for reducing a distortion component related to a baseband transmit signal in a baseband receive signal, comprising: a distortion meter including a correlation unit configured to correlate a signal that depends on the baseband receive signal and a signal that depends on the baseband transmit signal; and a combiner configured to provide the baseband receive signal using the received radio frequency signal and a plurality of settings based on a correlation result of the distortion meter.

In example 2, the plurality of settings comprises a bias voltage of the combiner and the receiver is configured to adjust the bias voltage based on the correlation result.

In example 3, the correlation unit of the receiver of example 2 is configured to iteratively correlate the signal that depends on the baseband receive signal and the signal that depends on the baseband transmit signal and the receiver is configured to iteratively adjust the bias voltage of the combiner based on the correlation result until the correlation result satisfies a condition.

In example 4, the distortion meter is configured to normalize the correlation result using a signal power of the signal that depends on the baseband transmit signal.

In example 5, the correlation result includes a magnitude and a sign of the correlation.

In example 6, the distortion meter further comprises a pre-filter having a configurable transfer function; and a processing unit having a non-linear transfer function, wherein the pre-filter and the processing unit are configured to provide the signal that depends on the baseband transmit signal based on the baseband transmit signal.

In example 7, the pre-filter of the receiver of example 6 comprises a complex filter configured to filter the baseband transmit signal.

In example 8, the pre-filter of the receiver of example 6 or 7 is configured to band-pass filter the baseband transmit signal.

In example 9, the pre-filter of the receiver of example 6, 7 or 8 comprises a plurality of selectable configurable transfer functions.

In example 10, the distortion meter further comprises an offset correction unit configured to modify an amplitude of the signal that depends on the baseband transmit signal by a mean amplitude of the signal that depends on the baseband transmit signal.

In example 11, the distortion meter further comprises an alignment unit configured to timely align the signal that depends on the baseband receive signal and the signal that depends on the baseband transmit signal such that a representation of the distortion component within the signal that depends on the baseband receive signal and a related representation of the baseband transmit signal within the signal that depends on the baseband transmit signal occur at a same time instant.

In example 12, the distortion meter further comprises a normalization unit configured to normalize the signal that depends on the baseband transmit signal using an output power of an amplifier for amplifying a radio frequency transmit signal generated from the baseband transmit signal.

In example 13, the distortion meter further comprises a first sample rate converter configured to provide the signal that depends on the baseband transmit signal with a common sample rate which is identical to or different from a sample rate of the baseband transmit signal; and a second sample rate converter configured to provide the signal that depends on the baseband receive signal with the common sample rate.

In example 14, the distortion meter is configured to determine a correlation quality indicator which indicates an amount of the distortion component in the baseband receive signal based on a relation between a best correlation and a second best correlation between the signal that depends on the baseband receive signal and the signal that depends on the baseband transmit signal.

In example 15, the distortion meter of the receiver of any of examples 1 to 13 is configured to determine a correlation quality indicator which indicates an amount of the distortion component in the baseband receive signal based on a relation between a best correlation and an average correlation between the signal that depends on the baseband receive signal and the signal that depends on the baseband transmit signal.

In example 16, the baseband transmit signal is a digital signal and the baseband receive signal is digital signal.

In example 17, the distortion component is a second order intermodulation distortion component.

Example 18 is a transceiver comprising a receiver according to any of examples 1 to 17 and a transmitter.

In example 19, the transceiver of example 18 further comprises a duplexer coupled to the receiver and to the transmitter and configured to provide the received radio frequency signal to the receiver.

Example 20 is a transceiver comprising a receiver according to example 9, a transmitter and a duplexer coupled to the receiver and to the transmitter and configured to provide the received radio frequency signal to the receiver, wherein the pre-filter is configured to utilize a transfer function out of the plurality of selectable configurable transfer functions which corresponds to a transfer function of the duplexer.

Example 21 is a mobile communications device comprising a transceiver according to any of examples 18 to 20.

In example 22, the mobile communications device further comprises at least one antenna element coupled to the transceiver.

Example 23 is a means for reducing a distortion component related to a baseband transmit signal in a baseband receive signal, comprising: a means for determining the distortion component including a means for correlating a signal that depends on the baseband receive signal and a signal that depends on the baseband transmit signal; and a means for providing the baseband receive signal using the received radio frequency signal and a plurality of settings based on a correlation result of the means for determining the distortion component.

In example 24, the plurality of settings comprise a bias voltage of the means for providing the baseband receive signal and the means for reducing a distortion component is configured to adjust the bias voltage based on the correlation result.

In example 25, the means for determining the distortion component of the means for reducing a distortion component of example 24 is configured to iteratively correlate the signal that depends on the baseband receive signal and the signal that depends on the baseband transmit signal and the means for reducing a distortion component is configured to iteratively adjust the bias voltage of the means for providing the baseband receive signal based on the correlation result until the correlation result satisfies a condition.

In example 26, the means for determining the distortion component is configured to normalize the correlation result using a signal power of the signal that depends on the baseband transmit signal.

In example 27, the correlation result includes a magnitude and a sign of the correlation.

In example 28, the means for determining the distortion component further comprises a means having a configurable transfer function and a means having a non-linear transfer function, wherein the means having a configurable transfer function and the means having a non-linear transfer function are configured to provide the signal that depends on the baseband transmit signal based on the baseband transmit signal.

In example 29, the means having a configurable transfer function comprises a means configured to filter the baseband transmit signal using complex filter coefficients.

In example 30, the means having a configurable transfer function of the means for reducing a distortion component of example 28 or 29 is configured to band-pass filter the baseband transmit signal.

In example 31, the means having a configurable transfer function of the means for reducing a distortion component of example 28, 29 or 30 comprises a plurality of selectable configurable transfer functions.

In example 32, the means for determining the distortion component further comprises a means modifying an amplitude of the signal that depends on the baseband transmit signal by a mean amplitude of the signal that depends on the baseband transmit signal.

In example 33, the means for determining the distortion component further comprises a means for timely aligning the signal that depends on the baseband receive signal and the signal that depends on the baseband transmit signal such that a representation of the distortion component within the signal that depends on the baseband receive signal and a related representation of the baseband transmit signal within the signal that depends on the baseband transmit signal occur at a same time instant.

In example 34, the means for determining the distortion component further comprises a means for normalizing the signal that depends on the baseband transmit signal using an output power of a means for amplifying a radio frequency transmit signal generated from the baseband transmit signal.

In example 35, the means for determining the distortion component further comprises a means for providing the signal that depends on the baseband transmit signal with a common sample rate which is identical to or different from a sample rate of the baseband transmit signal; and a means for providing the signal that depends on the baseband receive signal with the common sample rate.

In example 36, the means for determining the distortion component is configured to determine a correlation quality indicator which indicates an amount of the distortion component in the baseband receive signal based on a relation between a best correlation and a second best correlation between the signal that depends on the baseband receive signal and the signal that depends on the baseband transmit signal.

In example 37, the means for determining the distortion component of the means for reducing a distortion component of any of examples 23 to 35 is configured to determine a correlation quality indicator which indicates an amount of the distortion component in the baseband receive signal based on a relation between a best correlation and an average correlation between the signal that depends on the baseband receive signal and the signal that depends on the baseband transmit signal.

In example 38, the baseband transmit signal is a digital signal and the baseband receive signal is digital signal.

In example 39, the distortion component is a second order intermodulation distortion component.

Example 40 is a method for reducing a distortion component related to a baseband transmit signal in a baseband receive signal, comprising: correlating a signal that depends on the baseband receive signal and a signal that depends on the baseband transmit signal; and providing the baseband receive signal by means of a combiner using the received radio frequency signal and a plurality of settings based on a correlation result.

In example 41, the plurality of settings comprise a bias voltage of the combiner and the method further comprises adjusting the bias voltage based on the correlation result.

In example 42, the method is carried out iteratively until the correlation result satisfies a condition.

In example 43, the method further comprises normalizing the correlation result using a signal power of the signal that depends on the baseband transmit signal.

In example 44, wherein the correlation result includes a magnitude and a sign of the correlation.

In example 45, the method further comprises providing the signal that depends on the baseband transmit signal by pre-filtering the baseband transmit signal using a configurable transfer function; and processing the baseband transmit signal using a non-linear transfer function.

In example 46, the method of any of examples 40 to 44 further comprises providing a plurality of configurable transfer functions; pre-filtering the baseband transmit signal using the plurality of configurable transfer functions; determining a correlation result for each of the plurality of configurable transfer functions; and selecting the configurable transfer function having associated thereto the correlation result having the highest correlation quality.

In example 47, pre-filtering the baseband transmit signal in the method of example 45 or 46 comprises filtering the baseband transmit signal using complex filter coefficients.

In example 48, pre-filtering the baseband transmit signal in the method of example 45, 46 or 47 comprises band-pass filtering the baseband transmit signal.

In example 49, the method further comprises modifying an amplitude of the signal that depends on the baseband transmit signal by a mean amplitude of the signal that depends on the baseband transmit signal.

In example 50, the method further comprises timely aligning the signal that depends on the baseband receive signal and the signal de-pending on the baseband transmit signal such that a representation of the distortion component within the signal that depends on the baseband receive signal and a related representation of the baseband transmit signal within the signal that depends on the baseband transmit signal occur at a same time instant.

In example 51, the method further comprises normalizing the signal that depends on the baseband transmit signal using an output power of an amplifier for amplifying a radio frequency transmit signal generated from the baseband transmit signal.

In example 52, the method further comprises providing the signal that depends on the baseband transmit signal with a common sample rate which is identical to or different from a sample rate of the baseband transmit signal; and providing the signal that depends on the baseband receive signal with the common sample rate.

In example 53, the method further comprises determining a correlation quality indicator which indicates an amount of the distortion component in the baseband receive signal based a relation between a best correlation and a second best correlation between the signal that depends on the baseband receive signal and the signal that depends on the baseband transmit signal.

In example 54, the method of any of examples 40 to 52 further comprises determining a correlation quality indicator which indicates an amount of the distortion component in the baseband receive signal based on a relation between a best correlation and an average correlation between the signal that depends on the baseband receive signal and the signal that depends on the baseband transmit signal.

In example 55, the baseband transmit signal is a digital signal and the baseband receive signal is digital signal.

In example 56, the distortion component is a second order intermodulation distortion component.

Example 57 is a computer readable storage medium having stored thereon a program having a program code for performing the method of any of examples 40 to 56, when the program is executed on a computer or processor.

Example 58 is a computer program having a program code configured to perform the method of any of examples 40 to 56, when the computer program is executed on a computer or processor.

Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. A receiver for reducing a distortion component related to a baseband transmit signal in a baseband receive signal, comprising:
    a distortion meter circuit comprising a correlation circuit configured to correlate a signal that depends on the baseband receive signal and a signal that depends on the baseband transmit signal; and
    a combiner circuit configured to provide the baseband receive signal using a received radio frequency signal and a plurality of settings based on a correlation result of the distortion meter,
    wherein the plurality of settings comprises a bias voltage of the combiner circuit, and
    wherein the receiver is configured to adjust the bias voltage based on the correlation result.

2. The receiver of claim 1, wherein the correlation circuit is configured to iteratively correlate the signal that depends on the baseband receive signal and the signal that depends on the baseband transmit signal and the receiver is configured to iteratively adjust the bias voltage of the combiner circuit based on the correlation result until the correlation result satisfies a condition.

3. The receiver of claim 1, wherein the distortion meter circuit is configured to normalize the correlation result using a signal power of the signal that depends on the baseband transmit signal.

4. The receiver of claim 1, wherein the correlation result includes a magnitude and a sign of the correlation.

5. The receiver of claim 1, wherein the distortion meter circuit further comprises:
    a pre-filter having a configurable transfer function; and
    a processing circuit having a non-linear transfer function,
    wherein the pre-filter and the processing circuit are configured to provide the signal that depends on the baseband transmit signal based on the baseband transmit signal.

6. The receiver of claim 5, wherein the pre-filter comprises a plurality of selectable configurable transfer functions.

7. The receiver of claim 1, wherein the distortion meter circuit further comprises an offset correction circuit configured to modify an amplitude of the signal that depends on the baseband transmit signal by a mean amplitude of the signal that depends on the baseband transmit signal.

8. The receiver of claim 1, wherein the distortion meter circuit further comprises a normalization circuit configured to normalize the signal that depends on the baseband transmit signal using an output power of an amplifier for amplifying a radio frequency transmit signal generated from the baseband transmit signal.

9. A receiver for reducing a distortion component related to a baseband transmit signal in a baseband receive signal, comprising:
a distortion meter circuit comprising a correlation circuit configured to correlate a signal that depends on the baseband receive signal and a signal that depends on the baseband transmit signal; and
a combiner circuit configured to provide the baseband receive signal using a received radio frequency signal and a plurality of settings based on a correlation result of the distortion meter,
wherein the distortion meter circuit is configured to determine a correlation quality indicator which indicates an amount of the distortion circuit in the baseband receive signal based on a relation between a best correlation and a second best correlation between the signal that depends on the baseband receive signal and the signal that depends on the baseband transmit signal, or
wherein the distortion meter circuit is configured to determine a correlation quality indicator which indicates an amount of the distortion circuit in the baseband receive signal based on a relation between a best correlation and an average correlation between the signal that depends on the baseband receive signal and the signal that depends on the baseband transmit signal.

10. A method for reducing a distortion component related to a baseband transmit signal in a baseband receive signal, comprising:
correlating a signal that depends on the baseband receive signal and a signal that depends on the baseband transmit signal; and
providing the baseband receive signal by means of a combiner circuit using a received radio frequency signal and a plurality of settings based on a correlation result,
wherein the plurality of settings comprise a bias voltage of the combiner circuit, and
wherein the method further comprises adjusting the bias voltage based on the correlation result.

11. The method of claim 10, wherein the method is carried out iteratively until the correlation result satisfies a condition.

12. The method of claim 10, further comprising:
normalizing the correlation result using a signal power of the signal that depends on the baseband transmit signal.

13. The method of claim 10, further comprising:
providing the signal that depends on the baseband transmit signal by pre-filtering the baseband transmit signal using a filter circuit having a configurable transfer function; and
processing the baseband transmit signal using a processing circuit comprising a non-linear transfer function.

14. The method of claim 10, further comprising:
providing a filter circuit having a plurality of configurable transfer functions;
pre-filtering the baseband transmit signal with the plurality of configurable transfer functions using the filter circuit;
determining a correlation result for each of the plurality of configurable transfer functions; and
selecting the configurable transfer function having associated thereto the correlation result having the highest correlation quality.

15. The method of claim 10, further comprising:
modifying an amplitude of the signal that depends on the baseband transmit signal by a mean amplitude of the signal that depends on the baseband transmit signal.

16. The method of claim 10, further comprising:
normalizing the signal that depends on the baseband transmit signal using an output power of an amplifier for amplifying a radio frequency transmit signal generated from the baseband transmit signal.

17. The method of claim 10, further comprising:
providing the signal that depends on the baseband transmit signal with a common sample rate which is identical to or different from a sample rate of the baseband transmit signal; and
providing the signal that depends on the baseband receive signal with the common sample rate.

18. The method of claim 10, further comprising:
determining a correlation quality indicator which indicates an amount of the distortion component in the baseband receive signal based a relation between a best correlation and a second best correlation between the signal that depends on the baseband receive signal and the signal that depends on the baseband transmit signal.

19. The method of claim 10, further comprising:
determining a correlation quality indicator which indicates an amount of the distortion component in the baseband receive signal based on a relation between a best correlation and an average correlation between the signal that depends on the baseband receive signal and the signal that depends on the baseband transmit signal.

20. A distortion reduction circuit configured to reduce a distortion component related to a baseband transmit signal in a baseband receive signal, comprising:
means for determining the distortion component including means for correlating a signal that depends on the baseband receive signal and a signal that depends on the baseband transmit signal; and
means for providing the baseband receive signal using a received radio frequency signal and a plurality of settings based on a correlation result of the means for determining the distortion component;
wherein the plurality of settings comprise a bias voltage of the means for providing the baseband receive signal, and
wherein the distortion reduction circuit is configured to adjust the bias voltage based on the correlation result.

* * * * *